(Model.)

W. GOODWIN.
COTTON GATHERER.

No. 244,887. Patented July 26, 1881.

Witnesses.
Edwin L. Yewell
H. Aubrey Toulmin

Inventor.
Williamson Goodwin.
By C. M. Alexander, his Atty.

N. PETERS, Photo-Lithographer, Washington, D. C.

UNITED STATES PATENT OFFICE.

WILLIAMSON GOODWIN, OF MORO, ASSIGNOR OF ONE-HALF TO WILLIS S. BROOKES, OF WHEATLEY, ARKANSAS.

COTTON-GATHERER.

SPECIFICATION forming part of Letters Patent No. 244,887, dated July 26, 1881.

Application filed June 16, 1881. (Model.)

*To all whom it may concern:*

Be it known that I, WILLIAMSON GOODWIN, of Moro, in the county of Lee, and in the State of Arkansas, have invented certain new and useful Improvements in a Cotton-Gatherer; and I do hereby declare that the following is a full, clear, and exact description thereof, reference being had to the accompanying drawings, and to the letters of reference marked thereon, making a part of this specification.

This invention relates to certain improvements in cotton-pickers; and it has for its objects to provide an improved means of collecting the cotton as it is picked, as more fully hereinafter specified. These objects I attain by the apparatus illustrated in the accompanying drawings, in which—

Figure 1:
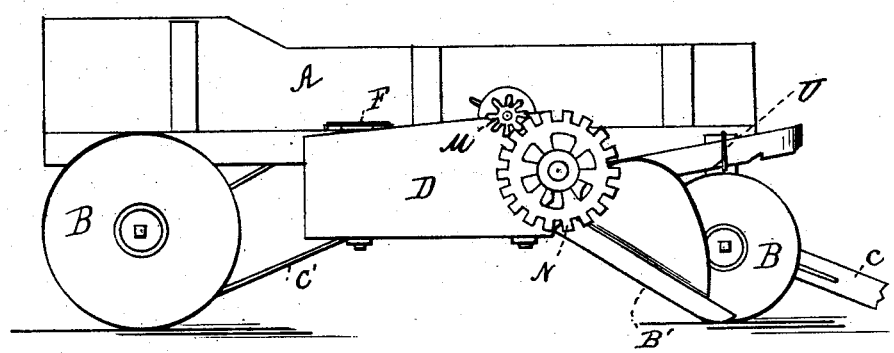
Figure 2:
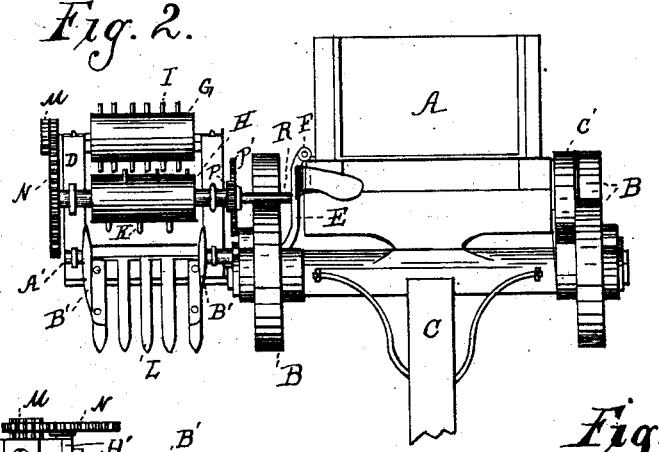
Figure 3:
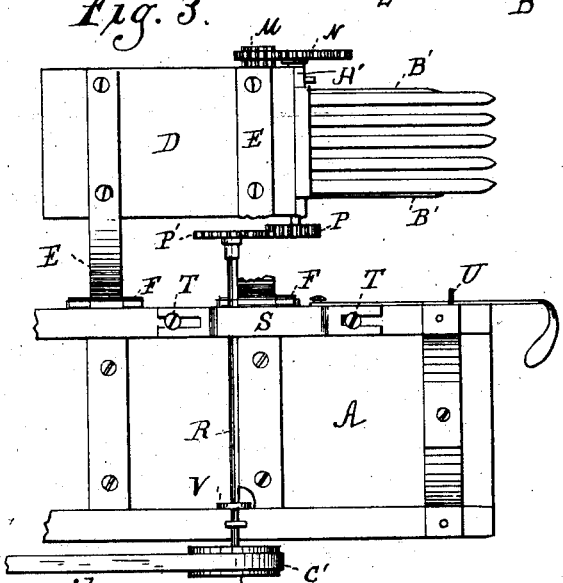
Figure 4:

Figure 1 represents a side elevation of my apparatus; Fig. 2, a front view; Fig. 3, a top view of the apparatus, and Fig. 4 one of the picking-teeth.

The letter A indicates the main body of the apparatus, which is mounted upon wheels B and provided with a tongue, C, by which it may be drawn.

The letter D indicates a box open at its forward end, and secured to the body A, at one side, by means of the curved hangers E, hinged to the body at F.

At the forward open end of the box D are journaled two rollers, G H, the upper one being provided with straight teeth I, and the lower one with curved teeth K, the lower roller acting as a gatherer to collect the cotton from the fingers L, and the upper one as a clearer to strip the cotton from the gatherer and transfer it to the box. The roller G is provided at its outer journal with a pinion, M, which meshes with a cog-wheel, N, mounted on the outer journal of the roller H, the inner journal being provided with a pinion, P, adapted to mesh with a cog-wheel, P', on the end of a transverse shaft, R, journaled below the body of the apparatus. The journal bearing or box S for the said shaft, at the side adjacent the box D, is adjustable longitudinally, being slotted at the ends and confined to the body by means of bolts T. The said bearing or box has a forwardly-extending notched arm passing through a guide, U, by means of which it may be moved back and forth.

V indicates a plate or disk secured to the shaft R and bearing against the inner edge of the lower outer rail of the wagon with a spring-pressure, so as to hold the shaft in a normal position, and automatically return it when required.

The letter L, as before mentioned, indicates a series of fingers secured to a shaft, A', journaled at the lower front edge of the box in such manner that the fingers at their forward ends will rest upon the ground and will strip the bolls from the plant as the apparatus advances.

The side fingers are provided with guards B', by which the bolls are held on the fingers and directed to the strippers.

The operation of my invention is as follows: When sufficient cotton has been collected in the box D the cog-wheel P' is disengaged from the pinion P by forcing back the shaft R, and the box is swung on its hinged hangers over the main body of the apparatus, depositing the cotton therein, after which it is returned to its normal position for a fresh collection. The shaft R receives its motion from a band, C', passing around a pulley, D', on the said shaft, and a pulley, E', on the rear driving-shaft.

Having thus described my invention, what I claim, and desire to secure by Letters Patent, is—

In combination with the main body of the apparatus, the box supported at the side of the same upon hinged hangers, the cotton-gathering mechanism, the adjustable driving-shaft, and mechanism for imparting motion thereto, substantially as and for the purposes specified.

In testimony whereof I affix my signature in presence of two witnesses this 25th day of May, 1881.

WILLIAMSON GOODWIN.

Witnesses:
W. S. BROOKES,
J. E. DOHERTY.